United States Patent [19]

Landi et al.

[11] 4,357,269

[45] Nov. 2, 1982

[54] MOLDING COMPOUND

[75] Inventors: Vincent R. Landi, Danielson; Jeffrey L. Dalton, Thompson, both of Conn.

[73] Assignee: Rogers Corporation, Rogers, Conn.

[21] Appl. No.: 241,521

[22] Filed: Mar. 9, 1981

[51] Int. Cl.³ .............................................. C08L 35/02
[52] U.S. Cl. ........................................ 523/206; 264/4; 525/936; 526/201; 526/322
[58] Field of Search ................. 260/29.6 WQ; 264/4; 525/936

[56] References Cited

U.S. PATENT DOCUMENTS 3,173,878 3/1965 Reyes .................................. 252/316
3,460,972 8/1969 Nack ..................................... 117/72

FOREIGN PATENT DOCUMENTS 950443 2/1964 United Kingdom .

Primary Examiner—Joseph L. Schofer
Assistant Examiner—Bernard Lipman
Attorney, Agent, or Firm—David S. Fishman

[57] ABSTRACT

A molding compound is disclosed comprising a diallyl phthalate compound and capsules of water.

7 Claims, No Drawings

MOLDING COMPOUND

BACKGROUND OF THE INVENTION

(1) Field of the Invention

The present invention relates to the field of molding compounds. In particular the present invention is directed towards molding compounds of either diallyl orthophthalate or diallyl isophthalate (both hereinafter referred to as DAP) containing encapsulated water.

(2) Description of the Prior Art

It is well known to add water to molding compounds in order to obtain the proper filling of molds, in particular complicated mold configurations. The common practice is to mix water directly into the molding compound. While this addition of water allows for the proper filling of an intricate mold configuration it does present some complications. If the water and molding compound are stored as a mixture, some water will be lost due to evaporation. This reduces the shelf life of the mixture and may result in improper filling of the mold if not enough water is present.

If the water is added just prior to molding, the mixing step must be performed each time molding is performed. This increases the time required for molding. Also, the addition of the water at the time of molding in a molding factory situation can lead to inconsistencies in the amount and manner of water addition.

SUMMARY OF THE PRESENT INVENTION

The present invention overcomes the above-discussed disadvantages and other complications of the prior art by providing a mixture of a DAP molding compound and microcapsules containing water.

In the practice of the present invention microcapsules of water are dry blended into a granular DAP molding compound. Preferably, the water is encapsulated within a resinous membrane which provides a barrier to the diffusion of water. It is also essential that this membrane break down during the molding process to release the water. This membrane material may be chosen from a large number of polymeric materials including plastics and resins and waxes. Preferably this membrane is polystyrene or one of the copolymers of styrene such as styrene/acrylonitrile copolymer. Other polymeric or oligomeric materials may also be used, especially those derived from olefinic or vinyl polymerization. The percentage by weight of water added to the final molding compound mixture should range between 0.1% and 2%. The preferred range is 0.2 to 1%. The mixture of the molding compound and the encapsulated water is achieved by a conventional technique, for example by tumbling the molding material in particulate form with the microcapsules of water in a blending operation. The molding material of the present invention may, for example, be employed in an in-line screw injection or transfer molding process. The resinous membrane ruptures during the molding step which releases the water and assures that the mold structure is properly filled with the molding compound.

The major advantage of using encapsulated water is that the capsule membrane inhibits any losses of water due to evaporation. This improves the shelf life of the molding compound mixture and assures that the mold, especially complicated molds, are properly filled.

DESCRIPTION OF THE PREFERRED EMBODIMENT

The present invention involves the dry mixing of either a diallyl orthophthalate or a diallyl isophthalate (hereinafter DAP) molding compound with microcapsules containing water. The preferred DAP compounds useful in the practice of the present invention are any of the compounds obtained by the method and procedures disclosed by U.S. Pat. No. 3,903,027, which is incorporated herein by reference.

The encapsulated water may be prepared by any known technique. It is preferable that the encapsulating material be polystyrene with the preferred encapsulating method resulting in water or a water containing mixture being encapsulated by the polystyrene.

An example of a method for preparing the preferred microcapsules is as follows. A primary dispersion of the W/O type is prepared by emulsifying 20 ml of water into 100 ml methylene chloride in which 10 grams of polystyrene have been previously disolved. This primary dispersion is then added into 800 ml of a 1% aqueous solution gelatin. This final solution is maintained at 32° C. and aggitated with a rotary impeller at a consistent rate for one hour. This initiates capsule formation. The result is a secondary dispersion of the [W/O]/W type. The aggitation is continued while the temperature is slowly raised to 40° C. and is continued at this temperature for one hour. This causes the methylene chloride to evaporate off, leaving behind polystyrene capsules containing water. The resulting capsules contain 30% by weight of water and range in size between 20 to 200 microns. The above method for producing microcapsules was essentially disclosed in "Microcapsule Processing and Technology", by Asaji Kondo, Marcel Dekker, Inc., 1979.

The capsules resulting from the above-discussed procedures would then be mixed with the DAP molding compound. This dry mixing can be performed by shaking together granular DAP molding compound with 1% microcapsules in a polyethylene bag. The final amount, by weight, of water added to the molding compound should range between 0.1% to 2%, preferrably 0.2% and 1%.

Samples of a DAP molding compound and a DAP molding compound prepared in accordance with the present invention having 1% microcapsules were molded on a Krauss-Maffei 80 ton screw injection press. These compounds were molded using a mold cavity designed for the manufacture of electronic connectors and having over one hundred complex thin sections known as barriers. The barriers were 0.020 inches thick. Both materials were molded under identical conditions: 330° F. mold temperature, 240° F. melt temperature, 5000 psi injection pressure, 60 seconds cure time. Twelve connectors were molded from each molding compound. The samples prepared from the DAP molding compound containing microcapsules had no unfilled barriers. The sample prepared from the DAP molding compound alone had 50 to 100 unfilled barriers per connector.

The molding compound with encapsulated water of the present invention may be used in any known molding technique. During the molding process the membrane ruptures releasing the water into the mold cavity. This assures that the mold cavity is properly filled with the DAP molding compound. This is especially important when molding complicated structures. The molding compound with water microcapsules has a longer storage life than previous molding compounds since the polymeric membrane inhibits the loss of water due to evaporation.

While a preferred embodiment has been described, various modifications and substitutions may be made thereto without departing from the spirit and scope of the invention. Accordingly, the present invention has been described by way of illustration and not modification.

What is claimed is:

1. A molding compound comprising:
   a diallyl phthalate molding compound; and
   0.1% to 2% by weight of encapsulated water.

2. The compound of claim 1 wherein the diallyl phthalate molding compound is selected from the group consisting of:
   diallyl isophthalate; and
   diallyl orthophthalate.

3. The compound of claim 1 wherein the water is encapsulated within a polymeric compound.

4. The compound of claim 3 wherein the polymeric compound is selected from the group consisting of:
   polystyrene and copolymers of styrene.

5. The compound of claim 1 wherein the encapsulated water ranges from 0.2% to 1% by weight.

6. The compound of claim 2 wherein the water is encapsulated within a polymeric compound.

7. The compound of claim 6 wherein the polymeric compound is selected from the group consisting of:
   polystyrene and copolymers of styrene.

* * * * *